United States Patent [19]

Fueyo

[11] 4,191,347
[45] Mar. 4, 1980

[54] FLAP CONTROL CIRCUITRY

[75] Inventor: Albert Fueyo, Mount Prospect, Ill.

[73] Assignee: Calco Manufacturing Company, Addison, Ill.

[21] Appl. No.: 839,424

[22] Filed: Oct. 5, 1977

[51] Int. Cl.² .......................................... B64C 13/00
[52] U.S. Cl. ................................. 244/76 A; 244/178
[58] Field of Search ............ 244/194, 83 E, 181, 244/178, 204, 213, 76 A; 364/433, 434, 431, 428; 318/583, 584, 563, 564, 565, 8; 340/282, 268

[56] References Cited

U.S. PATENT DOCUMENTS

| | | | |
|---|---|---|---|
| 2,834,010 | 5/1958 | Sieradzki | 340/268 |
| 2,927,750 | 3/1960 | Elmer | 244/83 E |
| 3,841,589 | 10/1974 | Appleby | 244/178 |

Primary Examiner—Reinhard J. Eisenzopf
Attorney, Agent, or Firm—Leo J. Aubel

[57] ABSTRACT

An aircraft flap sensing and control circuit for sensing and controlling the position of the flaps and for sensing and comparing the instantaneous movement and position of the flaps mounted on opposite wings of the aircraft.

4 Claims, 6 Drawing Figures

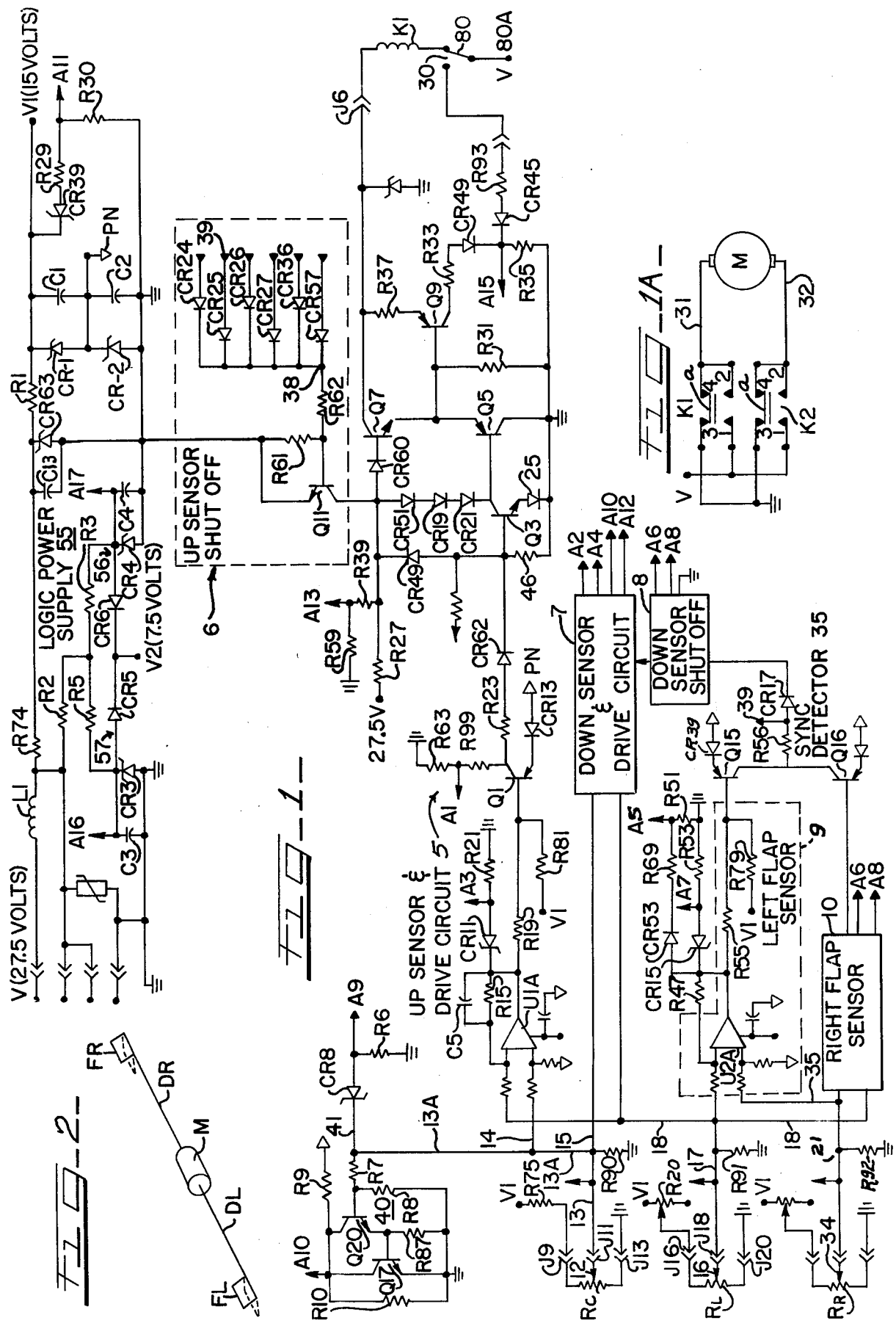

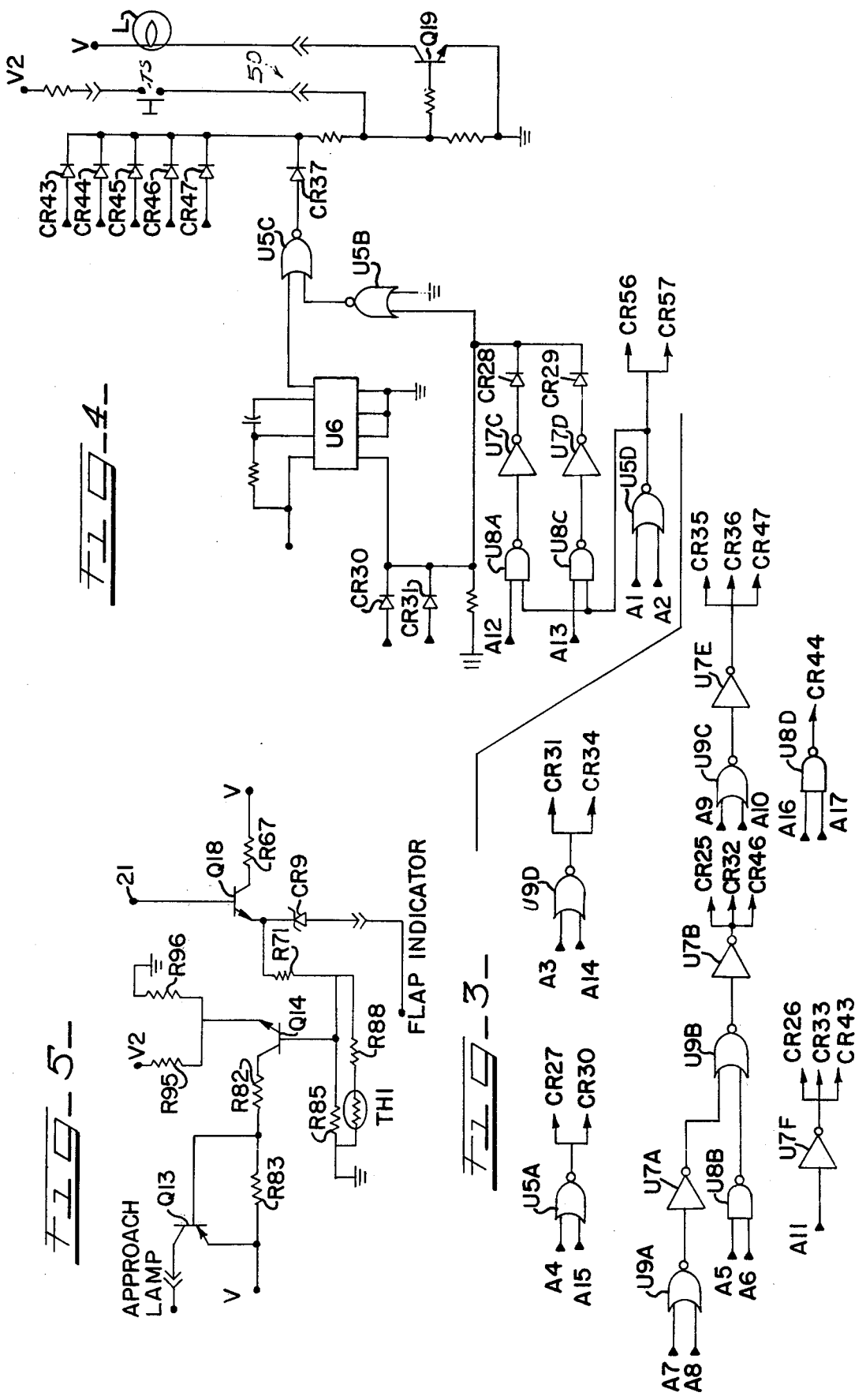

FLAP CONTROL CIRCUITRY

BACKGROUND AND SUMMARY OF THE INVENTION

Flap control and drive systems for aircraft are well known in the art. On certain aircraft, for example, the flaps may be controlled such as by activating a lever or switch which energizes a drive motor to drive the flaps to the selected position. In such systems, the pilot may visually check the condition of the flaps and if the selected position is intermediate between a full-up or a full-down flap position, the pilot may deactivate the lever or switch at the proper intermediate position.

The present flap control circuitry permits the pilot to select the position of the flaps by moving the lever to a point corresponding to the desired position of the flaps. The flap control circuitry will energize a motor, which is mechanically connected through flexible drive couplings, to drive the flaps to the desired position and then cause the motor to be deenergized, as depicted in the sketch of FIG. 2. The pilot can rely on the control circuitry to drive the flaps to the proper position, and once the pilot has selected the proper flap position, he can devote his attention to flying the aircraft.

Importantly, the inventive system includes circuitry to monitor the instantaneous position or angle of the flaps mounted on each of the wings and to compare the angles or positions of the flaps to each other. If the positions or angles of the flaps are more than a preselected tolerance apart, the system provides an indication that the movement and position of the flaps are, in fact, not synchronized and shuts down.

Further, the control circuitry of the invention includes various associated logic circuits for indicating faults or failures in the control circuitry itself.

The foregoing features and advantages of the present invention will be apparent from the following more particular description of the invention. The accompanying drawings listed hereinbelow are useful in explaining the invention wherein:

DESCRIPTION OF THE DRAWINGS

FIG. 1 is a schematic diagram of the electronic control circuit of the invention;

FIG. 1A is a schematic diagram of the motor drive which is controlled by the circuit of FIG. 1;

FIG. 2 is a sketch showing the motor mechanically connected to the flaps;

FIG. 3 is a schematic diagram of the logic blocks which are used to provide an indication of the circuit faults;

FIG. 4 is a schematic diagram of the circuit for controlling energization of the fault lamp; and FIG. 5 is a schematic diagram of the circuit which energizes the approach lamp and the flap position indicator.

DESCRIPTION OF THE INVENTION

Refer now to FIG. 1 showing the inventive circuitry or system, and more specifically to the lower left hand corner of the drawing. The circuit connections will first be described in detail and then the function or operation of the overall circuitry or system will be described.

As will be readily appreciated, the control circuit of FIG. 1 controls two identical flaps on the associated aircraft which flaps are movable from a neutral position upwardly or downwardly, in one of two directions; that is, a flap on the right wing and a flap on the left wing are selectively moved upwardly or downwardly from a given position. Accordingly, several of the sub-circuits of FIG. 1 are identical and for purposes of simplification of the drawings, the duplicate or identical sub-circuit is shown as a labeled block. For example, note the down sensor and drive circuit, shown as a block labeled 7, which is substantially identical to the up sensor and drive circuit 5; and, the right flap sensor shown as block labeled 10, which is substantially identical to the left flap sensor 9. For purposes of description of the motor circuit of FIG. 1A, note that the down sensor and drive circuit 7, which is identical to the up sensor and drive circuit 5, includes a relay K2, as shown, identical to relay K1.

A potentiometer $R_C$ which is the demand or control potentiometer, includes a wiper or movable arm 12 which is mechanically movable in response to the pilot's lever control, not shown. One terminal of potentiometer $R_C$ is coupled through a suitable connecting terminal J9 and a series resistor R75 to a voltage source V1 (15 volts); and, the opposite terminal of potentiometer $R_C$ is connected through suitable connecting terminal J13 to ground reference. Wiper arm 12 is electrically coupled through a connecting terminal J11 and electrical leads 13, 13A and 14 to the non-inverting input of an operational amplifier (Op Amp) circuit labeled U1A in the Up sensor and drive circuit 5. Wiper arm 12 is also coupled through a resistor R90 to ground.

As will become clear, wiper arm 12 of potentiometer $R_C$ provides a voltage which is representative of the position to which the flaps are to be driven. This signal is provided to the up sensor and drive circuit 5 to energize the motor M to drive the flaps FL and FR, see FIG. 2.

A second potentiometer $R_L$ similar to potentiometer $R_C$ has its wiper arm 16 connected to move responsively to the movement of the flap on the left wing of the aircraft; and hence, provides a voltage output which is representative of the instantaneous position or angle of the flap on the left wing of the aircraft. Potentiometer $R_L$ has one terminal connected through a suitable connector J16 and a trimmer potentiometer R20 to source V1 and its other terminal connected through connector J20 to ground reference. Wiper arm 16 is electrically coupled through connector J18 through leads 17 and 18 to the inverting input of Op Amp U1A.

The output of Op Amp U1A is connected to the base of PNP transistor Q1 also in the up sensor and drive circuit 5. The base of transistor Q1 is connected through resistor R81 to voltage source V1. The emitter of transistor Q1 is connected through a diode CR13 to common potential and the collector of transistor Q1 is connected to couple an output through series resistor R23 and diode CR62 to the base of NPN transistor Q3. The collector of transistor Q1 is also connected through series resistors R63 and R99 to ground to provide a logic bit generator, as will be explained hereinafter. The base of transistor Q3 is connected through a resistor 46 to ground and the emitter of transistor Q3 is connected through diode 25 to ground. The output from transistor Q3 is coupled to the base of NPN transistor Q5. A logic bit is generated at the junction of series resistors R39 and R59 designated as logic point A13. The collector of transistor Q3 is connected through series connected diodes labeled CR21, CR19 and CR51 to the collector of NPN transistor Q11 in the up sensor shut off circuit 6. The junction of diode CR51 and the collector of transistor Q11 is connected through resistor R27 to source V (27.5 volts).

The collector of transistor PNP Q5 is connected to ground reference and its emitter is connected to the emitter of NPN transistor Q7. The base of transistor Q7 is connected through diode CR60 to the collector of transistor Q11. The collector of transistor Q7 is connected through connector J6 to one terminal of the coil of relay K1. The other terminal of the coil of relay K1 is connected through a two position switch 30 to the voltage source V (27.5 volts).

Assume initially, that the flaps FL and FR are in a neutral position and wiper arm 16 of potentiometer $R_L$ is centered such as shown in FIG. 1. Assume next that the pilot lever provides a command to move the flaps upwardly; that is, the pilot lever causes wiper arm 12 to move downward (as oriented in FIG. 1), off of its center position. The system is arranged such that when wiper arm 12 moves toward a higher voltage the system moves the flaps down and vice versa. Accordingly, the input voltage from wiper arm 12 will cause Op Amp U1A to provide an output through lead 21 and resistor 19 to the base of PNP transistor Q1 to cause transistor Q1 to conduct. When transistor Q1 conducts, it biases transistor Q3 to conduction. Transistor Q3 in turn causes transistors Q5 and Q7 to conduct. Transistors Q7 and Q5 are in effect, the direct switching circuit for relay K1 coil and the voltage source V. That is, when Q7 and Q5 turn on, the coil of relay K1 will be energized by the voltage source V through the path which may be traced from the voltage source V through the coil of relay K1, the collector to emitter of transistor Q7 and the emitter to collector of transistor Q5 to ground reference.

MOTOR CIRCUIT

Refer now to FIG. 1A which shows the control circuit for the motor M which provides an important feature of the invention.

Relays K1 and K2 each have two pairs of stationary contacts labeled in FIG. 1A as contacts 1, 2, 3 and 4 and a movable arm a. When relay K1 is energized, its movable arm a is closed to connect its contact 1 with its contact 2 and to thereby connect the voltage source V through lead 31 to one side of motor M. At this point, relay K2 is deenergized and the other side of motor M is connected through lead 32, stationary contacts 3 and 4 and arm a of relay K2 to ground.

When relay K1 is deenergized, its movable arm a connects ground reference through lead 31 and stationary contacts 3 and 4 to that (the upper) side of the motor M. Likewise, when relay K2 is energized, its movable arm a connects the voltage source V through lead 32 and stationary contacts 1 and 2 to the other (lower) side of the motor M.

Obviously, if both relays K1 and K2 are deenergized, the motor M will not operate. Note also that, if both relays K1 and K2 should be energized at the same time, such as by some circuit fault, the voltages to the two sides of the motor would be in opposing or bucking relation and the motor M would not operate.

Refer back again to FIG. 1, and to the condition when the pilot moved the pilot lever to command an up-flap condition thereby energizing relay K1 to close its contacts 1 and 2 to connect the source voltage V to rotate the motor M and move the flaps FL and FR (FIG. 2) upwardly. The motor M will continue to rotate to move the flaps until the flaps reach the desired position at which point the motor will be caused to stop, controlled by the circuit of FIG. 1 as will now be described.

As mentioned above, the wiper 16 of potentiometer $R_L$ moves in response to the movement of the left flap. The voltage coupled from wiper arm 16 is coupled as an input to the inverting terminal of Op Amp U1A. When the voltage on wiper arm 16 balances the voltage on wiper arm 12 of potentiometer $R_C$ this indicates that the left flap FL has moved to the position selected by the pilot lever. Circuitwise, the two inputs to Op Amp U1A are balanced and the output of Op Amp U1A is decreased thereby turning OFF the amplifier transistors Q1 and Q3, and thus the switching transistors Q7 and Q5. Accordingly, relay coil K1 is deenergized, opening its contacts 1 and 2 and disconnecting the power to the motor M and stopping the flaps at the position attained. Note that both flaps FL and FR are concurrently being moved by the motor and that the balancing or comparing voltage corresponds to the position of only one flap.

The down sensor and drive circuit 7 which provides the drive control for moving or positioning the flap in a down position is essentially identical to, and operates in the same manner, as the up sensor and drive circuit 5. In this instance, the connections of the wiper arms 12 and 16 of potentiometers RC and $R_L$ are connected, respectively, to the inverting and non-inverting inputs of the Op Amp in the down sensor and drive circuit 7 corresponding to Op Amp U1A in up sensor and drive circuit 5. Also, the down sensor and drive circuit 7 controls the relay K2 to drive the motor M in an opposite or down direction relative to that when relay K1 is energized.

A two position switch, not shown, is connected to a terminal point in the down drive circuit 7 equivalent to point 80A in the up drive circuit 5 which switch is mechanically connected to the pilot lever; and its purpose is to prevent relay K2 from being energized when potentiometer $R_C$ is in a full up demand position, while forcibly causing K1 drive circuits to be energized, regardless of the input sensors.

As discussed above, the wiper 16 of potentiometer $R_L$ is mechanically connected to respond to the movement and position of the flap FL on the left wing of the aircraft. An important feature of the invention is the flap sensing and comparing circuit for sensing and comparing the position of the flaps on opposite wings of the aircraft. For this purpose, the circuit of FIG. 1 includes a third potentiometer $R_R$ essentially identical to potentiometer $R_L$ and a left flap sensor circuit 9 which is essentially identical to a right flap sensor circuit 10.

To provide the flap position and movement comparison functions, the output from the wiper arm 16 of potentiometer $R_L$ is compared to the output from wiper arm 34 of potentiometer $R_R$. As will be readily appreciated, wiper arm 34 of potentiometer $R_R$ provides the indication of the position and movement of the flap FR on the right wing of the aircraft.

More specifically, the output of wiper arm 16 of potentiometer $R_L$ is connected as an input to the inverting circuit of Op Amp U2A and through lead 18 to the non-inverting input of the corresponding Op Amp in the right flap sensor 10. In turn, the output of wiper arm 34 of potentiometer $R_R$ is connected as the input through lead 35 of the non-inverting input of Op Amp U2A in left flap sensor 9 and to the inverting input of the corresponding Operational Amp in the right flap sensor 10. The output of Op Amp U2A is connected through a resistor R55 as an input to the base of a PNP transistor Q15 comprising a portion of a sync detector 35. The base of transistor Q15 is connected through resistor R79 to voltage source V1 and the emitter of transistor Q15 is connected through a diode CR39 to a common potential. The collector of transistor Q15 is connected to the collector of a PNP transistor Q16 which is connected to the right flap sensor 10 similarly as transistor Q15 is connected to the left flap sensor 9. Note that transistors Q15 and Q16 are connected in relatively opposing relation. In operation, the potentials from wiper arm 16 of potentiometer $R_L$ and wiper arm 34 of potentiometer $R_R$ are thus cross connected to be compared in the left and right flap sensors 9 and 10. If the output from wiper arms 16 and 34 are balanced indicating that the flaps are in a corresponding position, within a given plus or minus tolerance, the output from the Op Amps in the left and right flap sensors 9 and 10 will be balanced, that is, essentially equal. Accordingly, the transistors Q15 and Q16 comprising the sync detector 35 will be equally biased and hence will not conduct. However, if for example, the positions of the flaps FL and FR do not correspond, wiper arms 16 and 34 of potentiometers $R_L$ and $R_R$ will provide unbalanced voltages to the operational amplifiers in the left and right flap sensors 9 and 10 thereby causing one of the transistors Q15 or Q16 to conduct. The output from the conducting transistor is coupled through a series resistor R56 to connection point 39 in the up shut off circuit 6 (see also upper right hand of FIG. 1). The same signal is coupled through diode CR17 to the connection point in the down shut off circuit 8.

The signals to the up and down shut off circuits 6 and 8 will deenergize relays K1 and K2 to switch off the motor M. For example, when a positive potential is applied to connection point 39 of the up shut off circuit 6, the positive potential couples through resistor R62 to the base of transistor Q11. Transistor Q11 will be caused to conduct thus connecting ground potential to the junction of diode CR60 and diode CR51. Accordingly, switching transistor Q7 will be turned off, to in turn cause the coil of relay K1 to be deenergized causing contacts 1 and 2 to open and interrupt power to the motor M.

ADDITIONAL FEATURE OF MOTOR CIRCUIT

The motor circuit of FIG. 1A also protects against faults that happen during passive periods. Assume for example, that a short occurs at terminal connector J6 and K1 is energized. The motor will turn on and begin to move the flaps; the left flap will signal back to the amplifier inputs, by way of $R_L$, that it has moved in the UP direction. Because the control potentiometer, $R_C$, has not moved, the voltage difference at the inputs will translate into a DOWN demand and K2 will be energized. Because of the circuit connections of FIG. 1A, the motor M stops. Therefore, any fault or combination of faults that cause either of the relays to be energized without a legitimate demand existing at the amplifier's inputs will generate a system shut-off signal.

APPROACH LAMP AND FLAP INDICATOR CIRCUIT

FIG. 5 shows a circuit connecting to point 21 of FIG. 1 which is in effect the wiper arm of potentiometer $R_R$. Point 21 connects to the base of NPN transistor Q18 which is caused to conduct to provide a flap movement indication when the flaps are lowered such as during a landing approach. The emitter of transistor Q18 provides a signal through zener diode CR9 to activate a flap indicator, not shown. The emitter of transistor Q18 is also connected to the base of NPN transistor Q14 through a biasing network including a temperature compensating thermistor TH1. An output from transistor Q18 also causes transistor Q18 and NPN transistor Q13 to conduct and switch on an approach lamp from the V voltage supply.

LOGIC BIT GENERATORS AND LOGIC POINTS

The circuit of FIGS. 1 and 1A include a number of logic bit generators connected at various points in the circuit to provide an indication of the proper operation of that portion of the circuit. More specifically, if the particular portion of the circuit is not operating properly, the associated logic bit generator provides an output to give an indication of improper operation such as by lighting the fault lamp L or by causing the motor M to be deenergized or turned off.

The logic bit generators provide outputs at various points in the circuit labeled with the prefix A. In one embodiment, logic points A1 through A17 are provided, (see FIGS. 1 and 1A). Each of the logic points is connected as an input to a respective logic circuit or gate, as shown in FIGS. 3 and 4. Note, of course, that there are logic points in down sensor and drive circuit 7 corresponding to the logic points shown in the up sensor and drive circuit 5.

More specifically, the logic points shown in the up sensor and drive circuit 5 correspond to the logic points in the down sensor and drive circuit 7 as follows:

A1 to A2;
A3 to A4;
A13 to A12;
A15 to A14

Likewise, logic points in the left flap sensor 9 correspond to the logic points in the right flap sensor 10 as follows:

A5 to A6;
A7 to A8;

In FIGS. 3 and 4, the connection points of the logic circuits are labeled by the point in the circuit of FIG. 1 to which that particular logic circuit connects.

FIGS. 3 and 4 also show various diode connecting circuits. Down sensor shut off circuit 8, which is essentially identical to up sensor shut off circuit 6, includes diodes numbered CR17, CR32, CR33, CR34, CR35 and CR56, which correspond respectively to the diodes CR24, CR25, CR26, CR27, CR36 and CR57 in up sensor shut off circuit 6.

LOGIC POINTS A1–A17

Refer now briefly to each of the A1 through A17 logic points, a more detailed explanation will follow, hereinbelow. The logic point A1 in the up sensor and drive circuit 5 monitors or senses the condition of transistor Q1. Logic point A2 is the corresponding point in the down sensor and drive circuit 7 and it monitors or senses the operation of the transistor corresponding to transistor Q1. Logic points A1 and A2 are connected as the two inputs to a Nor gate U5 as shown in FIG. 4.

Refer now to both FIGS. 1 and 3, and note logic points A3 and A15. Logic point A3 in the up sensor 5 is associated with logic point A14 in the down sensor 7. As mentioned, logic points A4 and A14 in the down sensor 7 corresponds to logic points A3 and A15 in the up sensor 5. Logic points A3 and A15 monitor the status of the switching transistors Q7 and Q5 and of transistor Q9; and, in addition, also sense whether transistors Q3 and Q1 have failed, their interrelation will be explained more fully hereinbelow. Logic points A3 and A14 are associates to sense the status of the corresponding transistors in the down sensor 7.

Logic points A5 and A7 in the left flap sensor are associated with logic points A6 and A8 in the right flap sensor 7 as shown in FIG. 3. This logic subassembly monitors the proper operation of the flap sensors as will be described.

Logic points A9 and A10 sense or check all status of circuit in the command potentiometer $R_C$.

Logic point A11 checks the logic supply voltage V1.

Logic point A13 checks for open circuit of transistor Q11 in the up sensor 5.

Logic point A12 in the down sensor 7 corresponds to a logic point 13 in the up sensor 5.

Logic points A16 and A17 monitor two circuits which provide the logic supply voltage V2.

LOGIC POINTS A1 and A2

Refer now to logic point A1 in the up sensor and drive circuit 5. Logic point A1 is at the junction of resistors R63 and R99 which are connected in series from the collector of transistor Q1 to ground. The emitter of transistor Q1 is connected through diode CR13 to the power supply neutral PN. Thus, in an UP demand condition, when transistor Q1 is conducting, logic point A1 is high. When transistor Q1 is off indicating a NO demand condition, A1 will be low. (For purposes of the discussion, the terms "high" and "low", and [+] and [−] refer to logic levels or voltages as are commonly used in the art.)

As mentioned above, logic point A2 is in the relative same position in the down sensor and drive circuit 7 and operates in the same manner with respect to the down sensor 7 as logic point A1 does in the up demand sensor 5.

Refer now to FIG. 4 and note that logic points A1 and A2 are connected as inputs to Nor gate U5D which provides a high output if both A1 and A2 are low. In an UP demand condition, A1 will be high and A2 will be low; and, in the DOWN demand condition the relative voltages will be reversed, i.e., A1 will be low and A2 will be high. Accordingly, Nor gate U5D will provide a low output in the normal demand conditions.

In a no demand condition, A1 and A2 will both be low, relays K1 and K2 are already deenergized so that A1 and A2 normally provide a redundant turn off control. The principal purpose of the foregoing is to check transistors Q11 and Q12 during passive periods. The output of the Nor gate U5D is also coupled as an output to Nand gates U8A and U8C for purposes to be described below.

LOGIC POINTS A3 AND A14; AND, A4 AND A15

Logic point A3 at the output of amplifier U1A of up demand sensor 5 is associated with a logic bit generator comprising a zener diode CR11 and resistor R21 connected from the output of Op Amp U1A to ground.

FIG. 3 shows logic point A3 in up sensor circuit 5 and logic point A14 in the down drive circuit 7 connected as the two inputs to Nor gate U9D. As stated above, logic point A4 in the down demand sensor 7 corresponds to logic point A3 in the up demand sensor 5 and logic point 14 corresponds to logic point 15 in the up drive circuit 7. Also, transistors Q1, Q3, Q5 and Q7 in up sensor 5 correspond to transistors Q2, Q4, Q6 and Q8 in the down sensor 7, respectively.

Logic point A15 is connected in the collector path of PNP transistor Q9. The emitter of transistor Q9 is connected through resistor R37 to one terminal of coil K1, and the collector is connected through series resistors R33 and R35 to ground. The base of transistor Q9 is connected to the junction of the emitter of transistors Q7 and Q5. The base of transistor Q9 is also connected through resistor R31 to ground. Logic point 15 is connected to the junction of resistors R33 and R35. Logic points A4 and A15 are connected as two inputs to Nor gate U5A.

The purpose of logic points A3 and A14 is to monitor the down sensor circuit 7 to assure that the transistors Q8, Q6, Q4 and Q2, not shown, but corresponding exactly to transistors Q7, Q5, Q3 and Q1, respectively, have not shorted.

Note that in order for the output from Nor gate U9D to be positive, both of its inputs must be low. And, if both inputs to Nor gate U9D are low, its outputs will cause relay K2 in the down sensor circuit 7 to be disconnected from the power to motor M; the same output from Nor gate U9D is coupled through diode CR31 to turn ON the fault lamp L.

Logic point A14 will go low if transistors Q8 and/or Q6 are shorted. However, logic point A14 will also go low if transistors Q8 and Q6 are in saturation; the latter being a valid or acceptable down demand condition. Logic point A14 will also go high in a no demand (balanced condition), and in a no demand condition, both of which are valid conditions. Accordingly, it is necessary to distinguish the unacceptable invalid conditions, when any of the transistors Q8, Q6, Q4 and Q2 may be shorted, from the acceptable or valid conditions.

Logic point A3 will be high when there is a down demand or a down demand condition for the flaps, and it will go low when there is an up demand or no demand. Accordingly, in the various situations the following voltage levels occur:

No Demand—A3 low; A14 high
Down demand—A3 high; A14 low
Up Demand—A3 low; A14 high
Short—A3 low; A14 low Accordingly, Nor gate U9D will not provide a positive output in the first three of the foregoing conditions. However, if one of the transistors Q8, Q6, Q4 and Q2 is shorted, A14 will go low. During conditions of no demand, logic point A3 will be low and Nor gate U9D will provide an output to deenergize the relay K2 and stop motor M, and also to turn on the fault lamp L.

Similarly, if any of the corresponding transistors in the up sensor and drive circuit 7, that is transistors Q7, Q5, Q3 and Q1, have shorted, Nor gate U5A will provide an output to deenergize the relay K1 and stop motor M and also to turn on fault lamp L.

LOGIC POINTS A5 AND A7; AND, A6 AND A8

Logic points A5 and A7 are positioned in a logic bit generator associated with the flap sensing system which includes zener diode CR15 and resistor R53 to ground. A diode CR53 in series with resistors R69 and R51 are connected across zener diode CR15 and resistor R53. The junction of resistor R47 and zener diode CR15 is also connected to the output of Op Amp U2A and through resistors R55 and R79 to voltage source VI. Logic point A5 is at the junction of resistor R69 and R51 and logic point A7 is at the junction of zener diode CR15 and resistor R53.

As noted above, logic points A6 and A8 in the right flap sensing circuit 10 correspond to and function in the same manner as logic points A5 and A7, respectively, in the left flap sensing circuit 9.

Logic points A5 and A6 are connected as the two inputs to Nand gate U8D and logic points A7 and A8 are connected as the two inputs to Nor gate U9A, see FIG. 3. The Nor gate U9A connects through inverter amplifier U7A as one input to Nor gate U9B, and the other input to Nor gate U9B comes from Nand gate U8B. The output of Nor gate U9B is connected through inverter amplifier U7B to diodes CR25, CR32 and CR46.

In the normal condition, terminal points A5 and A6 should be high and the terminal points A7 and A8 should be low. If all conditions are normal at the points A5, A6, A7 and A8, the output from inverter amplifier U7 is low.

Note that in a normal condition, logic point A7 will be low and logic point A5 will be high since the series circuit of diode CR53 couples the VL voltage to ground and zener diode CR15 in effect blocks off the voltage to A7. If there should be a fault in the circuit such as a short in Op Amp U2A, logic point A5 will go low and logic point A7 will remian low. If A5 is low and A6 is high, Nand gate U8B will provide a high, and Nor gate U9B will go low and inverter U7B will provide a high to diodes CR25 and CR32 to turn off the motor M and through diode CR46 to light the fault lamp L. If any one of the outputs from logic points A5, A6, A7 or A8 change due to a fault condition, the motor M will be turned off and the fault lamp L lighted.

Importantly, the logic circuits associated with logic bits A5, A6, A7 and A8 are redundant to the flap sync detector 35 as a means of shutting off the system. More specifically, if the left and right flap sensors are not operating properly, which can cause the sync detector 35 to function to indicate a fault, outputs will be generated at logic points A5, A6, A7 and A8 as described to shut off the system.

LOGIC POINTS 9 AND 10

Logic points 9 and 10 in the logic bit generator 40 (upper left hand corner of FIG. 1) checks the condition of the input leads and more particularly provides an indication when junctions J11, J9 and J13 or the associated lead 13A are open. The NPN transistor Q20 in logic bit generator 40 has its base connected through biasing resistor R8 to ground and through resistor R7 to wiper 12 of potentiometer $R_C$. The collector of transistor Q20 is connected through resistor R9 to supply neutral, and the emitter is connected to the base of transistor Q17 and through resistor R87 to ground. The emitter of transistor Q17 is connected to ground and its collector is connected to the collector of transistor Q20. Logic point A10 is connected to the collectors of transistors Q20 and Q17. A resistor R10 is connected across the collector to emitter path of transistor Q17. Lead 13A is also connected through zener diode CR8 and resistor R6 to ground. Logic point A9 is connected to the junction of zener diode CR8 and resistor R6.

In normal conditions, transistors Q20 and Q17 will be in a conducting condition due to the voltage provided by lead 13A to the base of transistor Q20. Also, logic point A9 will be low due to the same voltage. Should terminal J1-11 (lead 13A) open, transistors Q20 and Q17 will turn off and cause the voltage at point A10 to go high (to power neutral); logic point A9 stays at low.

As shown in FIG. 3, points A9 and A10 are connected as inputs to a two input Nor gate U9C which is coupled through an inverter amplifier U7E to provide a signal through diode CR35 to turn off the up drive circuit 5 and through diode CR36 to shut off the down drive circuit 7 should either A9 or A10 go high. The signal from inverter amplifier U7E is also coupled through diode CR47 to turn off the fault lamp L.

LOGIC POINT A13

Refer now to logic point A13. Series resistors R27, R39 and R59 are connected from source V1 to ground. The junction of resistors R27 and R39 is also connected to the collector of transistor Q11, through diode CR60 to the base of transistor Q7, and through diodes CR51, CR19 and CR21 to the collector of transistor Q3. Logic point A13 is connected to the junction of resistors R39 and R59.

In a no demand condition, or if transistor Q11 is conducting or has a short logic point, A13 will go low. If the logic points A1 and A2 are both low, indicating a no demand condition, the output from Nor gate U5D will be high which is coupled as an input to NAND gate U8C. The other input to NAND gate U8C is A12. If both inputs to NAND gate U8C are high, U8C will provide a low to inverter Amp U7D which in turn will provide a high through diode CR29 as an input to Nor gate U5B. The other input to Nor gate U5B is at ground. The high to gate U5B will provide a low to Nor gate U5C. The other input to Nor gate U5C is a delayed pulse from counter U6 received through diodes CR30 or CR31 from the logic gate U5A (FIG. 3) or the logic gate U9D. If the inputs to Nor gate U5C are both low, relatively high delayed voltage is applied through diode CR37 to turn on the fault lamp L. If one of the inputs to Nor gate U5C is high, gate U5C will provide a low output and the fault lamp L will not turn on. Thus, in order for CR37 to cause fault lamp L to go on, both A1 and A2 have to be low; A12 or A13 have to be high; A3 and A14 have to both be low or A4 and A15 have to both be low.

FAULT LAMP L SUB-CIRCUIT

The fault lamp L sub-circuit 50 comprises a fault lamp L having one terminal connected to the power source V and its other terminal connected through a terminal connector and the collector to emitter path of an NPN switching transistor Q19 to ground reference. Transistor Q19 has its base connected through suitable series resistors and control diodes CR43, CR44, CR45, CR46 and CR47. A positive potential to any of the foregoing diodes, forward biases the base of transistor Q19 to cause it to conduct and permit the fault indication L to light.

A test switch TS connects the logic voltage source V2 to the base of transistor Q19 to provide a positive bias to the base of transistor Q19 to enable the transistor to be turned on to test the operating condition of the fault lamp. This also tests for the presence of V2.

POWER SUPPLY CIRCUITS

The sub-circuit 55 (at the top of FIG. 1) comprises a logic supply circuit and includes various logic bit generators. Voltage source V at 27.5 volts is connected through an inductor L1, resistors R74 and R1 and series connected zener diodes CR1 and CR2 to ground; capacitors C1 and C2 are connected across zener diodes CR1 and CR2. A source voltage V1 taken across zener diodes CR1 and CR2 is 15 volts. The power supply neutral PN is provided at the junction of capacitors C1 and C2 and is at about 7.5 volts. A zener diode CR53 and a capacitor C13 connected across the VI output circuit protect against overvoltage surges.

A logic supply voltage V2 is obtained through the sub-circuit comprising a resistor R2, resistor R3 and zener diode CR4 connected to ground. A capacitor C4 is connected across zener diode CR4. The voltage V2 is obtained through diode CR6 connected to the junction of resistor R3 and zener diode CR4. A second sub-circuit which is a duplicate of, or redundant to, sub-circuit 56 includes a resistor R5 connected through zener diode CR3 to ground. A capacitor C3 is connected across zener diode CR3. The voltage V2 is obtained through diode CR5 connected to the junction of zener diode CR3 and resistor R5. If either of the sub-circuits 56 or 57 has an operating fault the other sub-circuit maintains the logic voltage V2 level.

The circuit 55 includes logic points A11, A16 and A17 for indicating the supply is operating properly. The voltages at logic points A16 and A17 are compared in a Nand circuit U8D and if either or both A16 or A17 are low, then the indicating fault lamp L is turned ON to indicate a fault.

The voltage V1 is monitored at logic point A11. If the voltage V1 is out or off, terminal point A11 will go to zero. Terminal A11 is coupled through an inverter amplifier U7A and when the voltage at A11 goes low, the output of amplifier U7F goes high and this voltage is coupled through CR26, CR33 and CR43 respectively to turn off the up drive system 5, the down drive system 7 and the fault lamp L.

While the invention has been particularly shown and described with reference to preferred embodiments thereof, it will be understood by those skilled in the art that various changes in form and details may be made therein without departing from the spirit and scope of the invention.

I claim:

1. An aircraft flap sensing and comparing circuit for comparing the movement and position of the flaps on an aircraft which flaps are driven by a motor selectively connected to a power source and are controlled by a control unit, comprising in combination:
   first means for obtaining a first analog voltage responsive to the position and movement of a first flap;
   second means for obtaining a second analog voltage responsive to the position and movement of a second flap;
   sensing means for sensing and comparing said first and second voltages and providing an output when said voltages are unequal above a given tolerance;
   first and second relay contacts connecting said power source to said motor;
   said first relay contacts being responsive to movement of said control unit in a first direction to connect the power source to drive said motor in a first direction of rotation;
   said second relay contacts connecting said power source to said motor to drive said motor in a second and relatively reverse direction; and,
   said first and second relay contacts connected in a relatively bucking relation such that when both said first and second relay contacts are energized, equal power is provided to opposite sides of the motor, and the motor will be caused to stop.

2. An aircraft flap sensing and comparing circuit as in claim 1 further comprising logic bit generator subcircuits connected at selected logic points in the circuit to provide a voltage indicating the operation status of that portion of the circuit.

3. A circuit as in claim 2 wherein said logic points are connected to logic gates to sense the operation of the circuit and further including interconnected logic points to distinguish between selected valid operating conditions of the circuit and fault conditions.

4. A circuit as in claim 3 further including logic circuitry for interconnecting said logic points to distinguish between valid operating conditions and circuit faults.

* * * * *